US005361504A

United States Patent [19]

Huang

[11] Patent Number: 5,361,504

[45] Date of Patent: Nov. 8, 1994

[54] UNIVERSAL GUIDE FOR ELECTRICAL HAND DRILL

[76] Inventor: Hung C. Huang, 9418 NE. 136th St., Kirkland, Wash. 98034-1815

[21] Appl. No.: 104,537

[22] Filed: Aug. 11, 1993

[51] Int. Cl.$^5$ .................... B23B 45/14

[52] U.S. Cl. .................... 33/371; 33/334; 33/DIG. 1; 33/342; 33/354; 33/451; 408/241 G; 408/110; 408/16

[58] Field of Search .................... 33/371, 333, 334, 340, 33/343, 347, 370, DIG. 1, 342, 354, 451, 372, 373, 376; 408/241 G, 95, 99, 100, 110, 51, 16

[56] References Cited

U.S. PATENT DOCUMENTS

| | | | |
|---|---|---|---|
| 1,845,801 | 2/1932 | Kupferman | 33/451 |
| 2,756,512 | 7/1956 | Pettit | 33/372 |
| 3,096,798 | 7/1963 | Pugsley | 408/110 |
| 3,100,408 | 8/1963 | Pufahl | 408/110 |
| 3,107,556 | 10/1963 | Pugsley | 408/110 |
| 3,119,286 | 1/1964 | Forman et al. | 408/110 |
| 3,820,249 | 6/1974 | Stone | 33/347 |
| 4,082,474 | 4/1978 | Stiger | 408/110 |
| 4,132,497 | 1/1979 | Weller et al. | 408/241 G |
| 4,457,078 | 7/1984 | Suchy | 33/334 |
| 5,246,197 | 9/1993 | MacDonald | 33/334 |

FOREIGN PATENT DOCUMENTS

| | | | |
|---|---|---|---|
| 1563105 | 3/1969 | France | 33/347 |
| 1934717 | 2/1970 | Germany | 33/347 |

*Primary Examiner*—Christopher W. Fulton
*Attorney, Agent, or Firm*—Fish & Richardson

[57] ABSTRACT

A universal guide for an electric drill includes a transparent elongated L-shaped member with two mutually perpendicular faces. Each face has two parallel long edges and two short edges, and they share a common long edge. For each face, one of the two short edges is a perpendicular edge and the other of the two short edges is an angled edge in which the perpendicular edges are perpendicular to the long edges, and the common edge is formed such that the perpendicular edges are mutually adjacent to each other and the angled edges are mutually adjacent to each other. Magnetic areas are formed on surfaces of each of the faces. Level indicators are attached to each face perpendicular to the common long edge and to the common long edge in a direction perpendicular to the perpendicular level indicators. At least one long edge is ruled and guide lines are marked on the faces in a direction parallel to the long edges. One angled edge forms a sixty degree angle with the common edge, and the other angled edge forms a forty five degree angle with the common edge. The short edges are formed to be non-slip edges.

8 Claims, 2 Drawing Sheets

UNIVERSAL GUIDE FOR ELECTRICAL HAND DRILL

FIELD OF THE INVENTION

This invention relates to a guide for an electric hand drill.

BACKGROUND OF THE INVENTION

Boring or drilling a hole accurately at a required angle or to a required depth using an electric hand drill typically requires some form of supplementary angle or depth-indicating device. Some devices, for example, air-bubble level indicators, are attached directly onto a drill. These have the disadvantage of being unstable and perpendicular to only one plane of the surface to be drilled. In order to achieve a true perpendicular angle with the surface to be drilled, both planes that form the right angle must be accounted for. The same is true for other angles.

Another type of angle-indicating attachment mounted onto an electric hand drill combines one or two shafts with springs. This device, of irregular shape and easily broken, is cumbersome to attach and use. After repeated use, the gap between the shaft and the shaft-slide holder tends to widen, causing the angle indicator to loosen and shake during drilling.

Some housing attachments have the disadvantage of the guide itself possibly slipping away from the surface and ceasing to function as a resisting force, as a stand or shaft-and-spring will do.

To gauge the depth of the hole to be drilled with accuracy, a resisting-force type device is preferred, especially when the work piece is made of softer materials, such as wood. In these instances, some devices cause a spiralling motion of drill bits, especially those of large diameters, which actually pulls the drill into the material. The operator of the drill thereby loses control of the push-and-pull tension with the material being drilled, which results in the drilling of a hole deeper than intended.

Adjustable-angle drill attachments are non-essential, yet they require a drill user's constant attention and are time-consuming to deal with. Most jobs that use an electric drill require only a few angles, the most common being ninety, sixty, and forty five degrees.

SUMMARY OF THE INVENTION

In general this invention features a guide for an electric drill comprising a transparent elongated L-shaped member, magnetic areas, and level indicators. The transparent elongated L-shaped member has two mutually perpendicular faces; each face has two parallel long edges and two short edges. The perpendicular faces share a common long edge. For each face, one of the two short edges is a perpendicular edge and the other is an angled edge. The perpendicular short edges are perpendicular to the long edges. The common edge is formed such that the perpendicular edges are mutually adjacent to each other and the angled edges are mutually adjacent to each other. The magnetic areas are formed on surfaces of each of the faces. Perpendicular level indicators are attached to each face perpendicular to the common long edge. A horizontal level indicator is attached to the common long edge in a direction perpendicular to the perpendicular level indicators.

In some embodiments, at least one long edge is ruled, that is, marked like a ruler, the level indicators are bubble-level indicators, and guide lines are marked on the faces in a direction parallel to the long edges.

In other embodiments, one angled edge forms a sixty degree angle with the common edge and one angled edge forms a forty five degree angle with the common edge.

In further embodiments the short edges are formed to be non-slip edges.

The guide of this invention is advantageous in that, when used in an inverted position, it can catch falling debris caused by drilling. Furthermore, the guide of this invention is preferably made from a light-weight strong material, thereby producing a light-weight drill guide. Since the guide of this invention is not permanently fixed to any one drill, it can be attached to a number of drills at different times. Finally, the guide of this invention is simple to manufacture and inexpensive because of its simplicity compared with the prior art.

Persons skilled in the art will recognize that many modifications may be made to the invention described in this application without departing from the spirit of the invention which is disclosed and claimed.

DETAILED DESCRIPTION OF THE INVENTION

Figure 1:
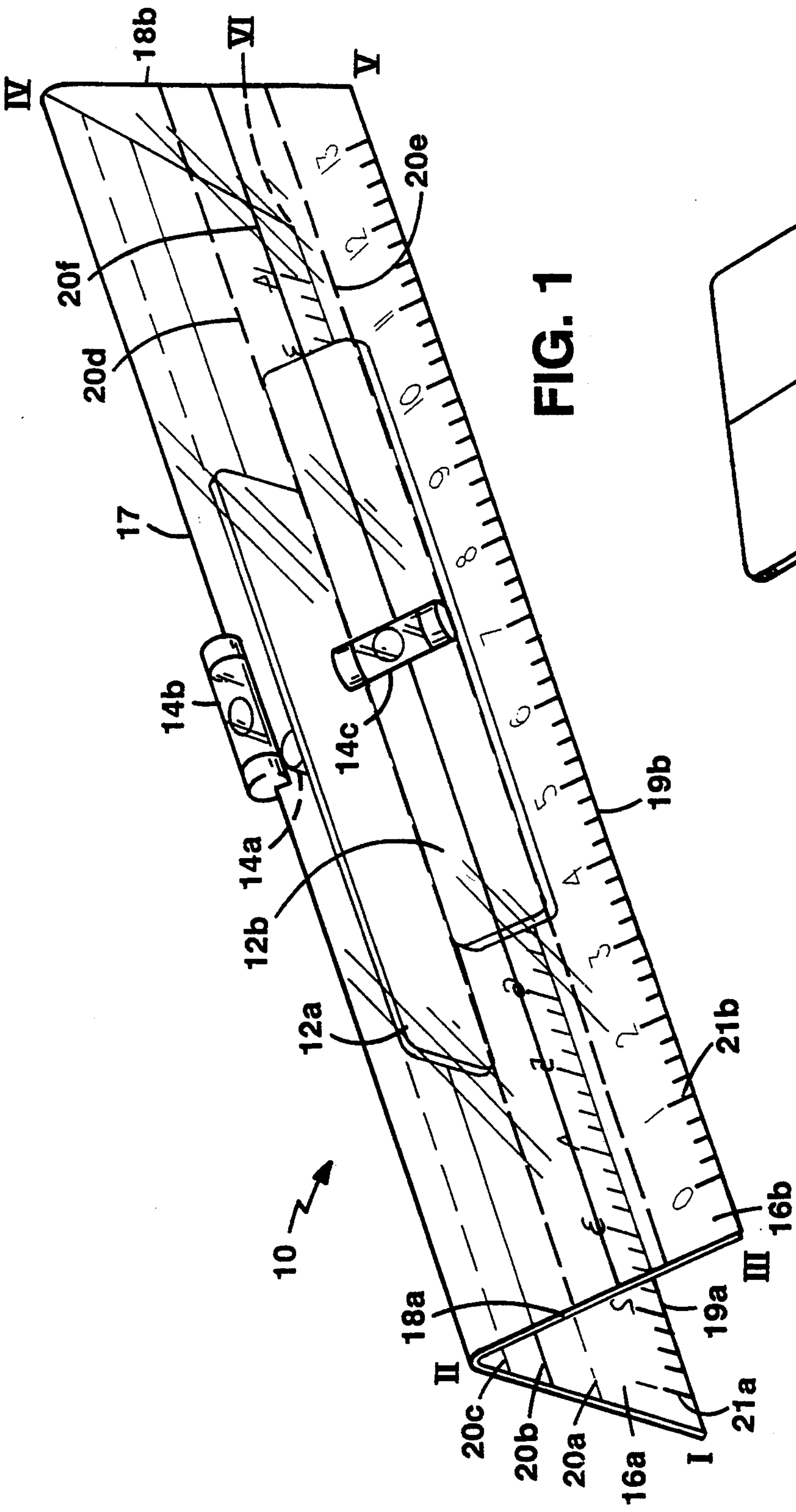
FIG. 1 is a perspective view of a drill guide according to this invention.
Figure 2:
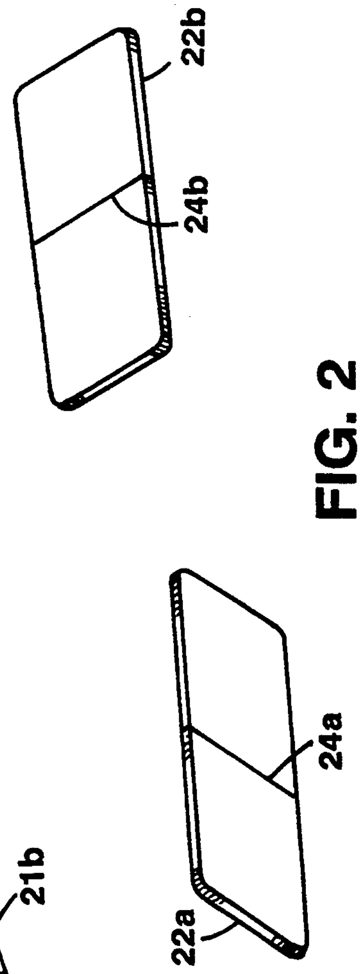
FIG. 2 is a perspective view of drill attachments used with the drill guide of FIG. 1.

Referring to FIG. 1, the universal guide 10 for an electric hand drill of this invention has an L-shaped, elongated transparent member having two faces **16*a* and 16*b*. The face 16*a* is delineated by its four corner points, denoted I, II, IV, and VI. One end of face 16*a* is at the edge I–II, and the other end of face 16*a* is at the edge IV–VI. Similarly, face 16*b* is delineated by its four corner points, denoted II, III, V, and IV. One end of face 16*b* is at the edge II–III, and the other end is at the edge V–IV. Three mutually parallel long edges 17 (II–IV), 19*a* (I–VI), and 19*b* (III–V) are formed by the guide 10**.

Each face 16 has supplementary parallel guide lines 20 marked thereon. The guide lines run the length of each face, that is, from one end to the other end, and they are mutually parallel to the three long edges 17, **19*a*–19*b*. Thus, face 16*a* has guide lines 20*a*–20*c*, and face 16*b* has guide lines 20*d*–20*f***.

One edge 19 of each face 16 has a ruler 21 etched thereon. Each ruler 21 runs the length of the face. Thus, on face **16*a*, ruler 21*a* is marked on edge 19*a* running from one end to the other (I–VI). Similarly, on face 16*b*, ruler 21*b* is marked on edge 19*b*** running from one end to the other (III–V). The scales of the rulers can be the same on both faces, or they can differ.

The edges 18 of the ends of the guide 10 are flat non-slip surfaces. In one preferred embodiment the edges are coated with a resin to give them the required non-slip property.

The two faces **16*a*–16*b*** are at right angles to each other. That is, the angle formed at II by the ends I–II and II–III is ninety degrees.

On one face, the angle of one end edge relative to the long edge is sixty degrees. On the other face, the angle of one end edge (on the same end as the sixty degree angle) relative to that face's long edge is forty five degrees. Thus, for face 16*a*, the angle at corner VI formed by the short edge IV–VI and the long edge VI–I is sixty degrees. For face 16*b*, the angle at corner V formed by the long edge III–V and the short edge V–IV is forty five degrees.

In other embodiments, angles other than sixty and forty five degrees may be chosen.

The inner surface of each face 16 has a magnetic area 12 thereon. The magnetic areas 12 can be formed by attaching one magnet over the entire area, or they can be formed by attaching a number of small magnets to the area. In one embodiment, the magnetic areas are formed by placing a number of small magnets into the inner surface of each face. The magnetic areas 12 cover a sufficient length of the side to engage a drill that has fully entered a hole. In one embodiment, the width of the magnetic areas is approximately one third the width of the face. As with the length, the width can vary according to the member used to engage the guide with a drill (to be described below).

In an embodiment which uses a number of small magnets to create a magnetic area, the gaps between the small magnets remain transparent.

Thus, the inner surface of face 16*a* has a magnetic area 12*a* formed thereon, and the inner surface of face 16*b* has magnetic area 12*b* formed thereon.

Three air-bubble level indicators 14 are attached to the guide 10. One level indicator 14*b* is attached to the top edge II–IV of guide 10 such that it indicates a level situation when that edge of the guide 10 is level. The other two level indicators 14*a*, 14*c* are each attached to a different face, 16*a*, 16*c* respectively, perpendicular to the level indicator 14*b* on the top edge. Level indicators 14*a*, 14*c* indicate when the edge 18*a* is level. The three level indicators 14 are attached on the outside and approximately in the center of the guide 10. In a preferred embodiment, the two level indicators 14*a*, 14*c* on the faces are attached within the magnetic areas 12*a*, 12*c* respectively.

In one preferred embodiment, the dimensions of the guide are as follows. The ends (I–II, II–III, IV–VI, and V–IV) of the faces 16 are approximately 2.5 inches long. The ruled edges 19 (I–VI and III–V) are approximately 12 inches long. The top edge (II–IV) where the faces 16 meet is approximately 15 inches long. The angled edges 18*b* (VI–IV and IV–V) are sufficiently long to form the required angles. The magnetic areas 12 are approximately 1 inch by 6 inches, and begin approximately 4 inches from the flat edge 18*a* of the guide.

These dimensions are given only by way of example of a preferred embodiment, and are in no way restrictive of embodiments of this invention.

Figure 3:
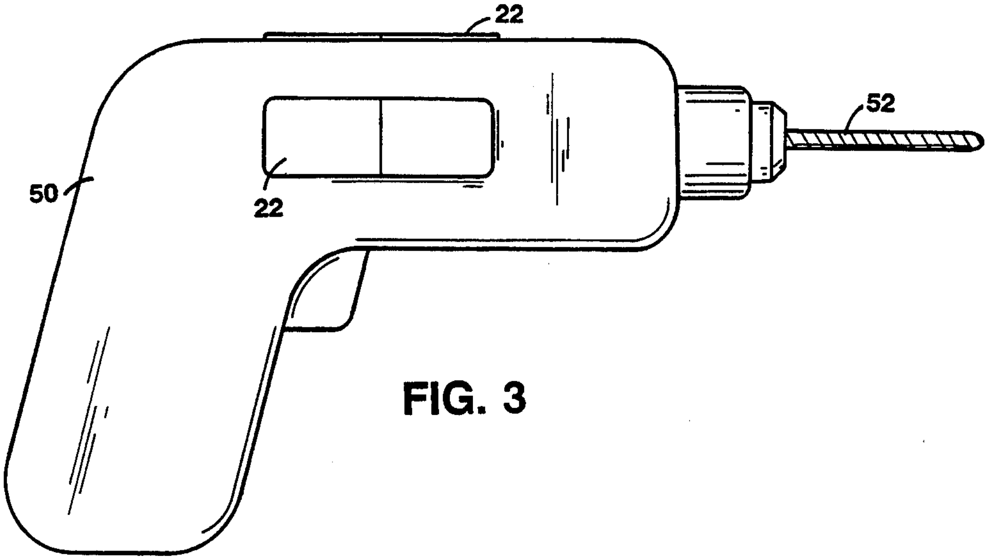
FIGS. 3 and 4 are side views of a drill on the drill guide and drill attachments of FIGS. 1 and 2, respectively, are mounted.
Figure 4:
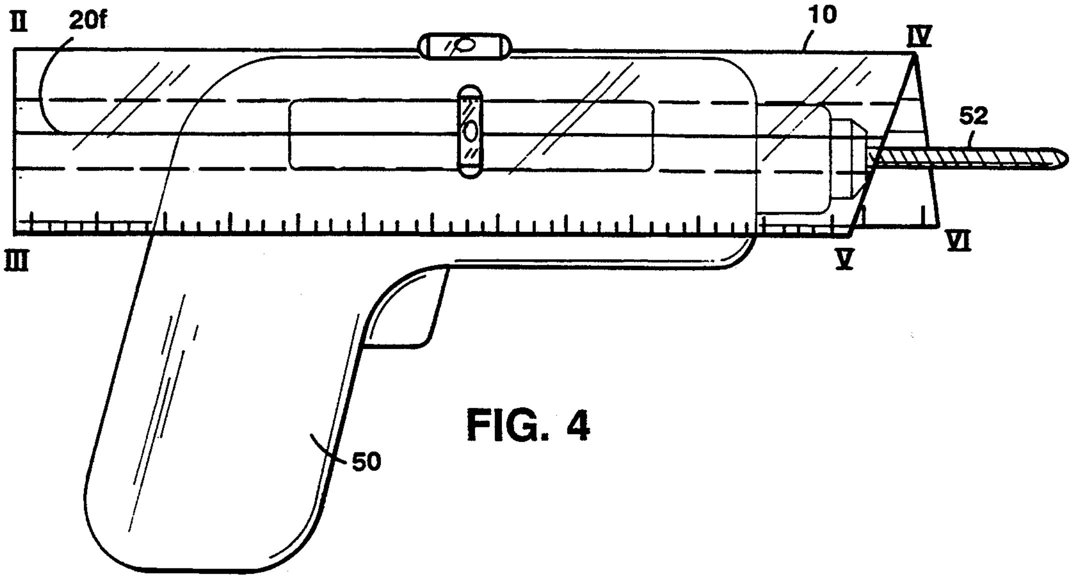

Referring to FIGS. 3 and 4, the drill guide 10 of FIG. 1 is used in conjunction with an electric hand drill 50. Two rectangular metallic drill attachments 22 are attached to the top and one side of a drill 50. The drill attachments 22 are made of a metal, for example, iron, that will be attracted to a magnet, and they are attached to a drill using, for example, double sided tape. Each drill attachment 22 has a supplementary guide line 24 marked on one of its surfaces, parallel to its short edges (and therefore perpendicular to its long edges). The drill attachments must be sufficiently large and appropriately shaped to slidably engage with the magnetic areas 12 on the guide 10 in such a way that, when the attachments are attached to a drill 50 and then slidably engage with the magnetic areas 12 on guide 10, the cause the guide 10 and the drill 50 to become magnetically attached. Because the attachments 22 are fixedly engaged with the drill 50, but only magnetically engaged to the magnetic areas 12 of the guide 10, the drill 50 and the guide become slidably engaged.

In one preferred embodiment the guides are approximately three inches long and one inch wide.

As in the case of the guide, these dimensions are given only by way of example of a preferred embodiment, and are in no way restrictive of embodiments of this invention.

The drill guide 10 is used in conjunction with an electric hand drill as follows.

The drill attachments 22 are attached to the top and one side of the body of a drill 50 in such a manner that the long edges of the attachments 22 are mutually parallel and the attachments can each slidably engage with one of the magnetic areas 12 simultaneously.

The attachments 22 (and thereby the drill 50) and the drill guide 10 are then slidably engaged so that the bit 52 of the drill (and therefore the drilling direction) is parallel to the long edges (II–IV, III–V, and I–VI) of the drill guide. Preferably, the drill of the bit 52 will be aligned with the center guide lines 20*b*, 20*f* of each face 16 of the guide 10.

Clearly, the drill 50 and the guide 10 can be slidably engaged such that the direction of drilling can extend toward either end of the guide.

Once the drill 50 and the guide 10 are slidably engaged, they can be used to drill holes at various angles and to various depths. By positioning the drill and guide in the appropriate direction and guiding it with the appropriate edge, it is possible to drill holes at angles of ninety, sixty, and forty five degrees. Using the ruled edges permits a drill operator to determine the depth of the drill bit in the hole it is currently drilling. The guide lines aid in keeping the drill parallel to the guide and thereby at the required drilling angle. The level indicators can be used to maintain the guide (and thereby the drill) level relative to the surface to be drilled.

The transparent nature of the guide 10 allows a drill operator to visually determine whether the drill and the guide are correctly positioned. This aids in drilling situations where the guide is to be held upside down or vertical. It also allows the guide to act as a shield or protector from flying debris caused by drilling.

When used in an inverted position, the sides and the L-shape of the guide can be used as a receptacle to catch falling debris caused by drilling.

The guide is preferably made from a lightweight strong material such as a clear tough plastic which is resistant to the heat generated by the drill in operation. It is preferred that the material from which the guide is made be elastic and not excessively hard or brittle. In this way the guide can function without adding too much extra weight to the combination of the drill and guide.

Pairs of attachments 22 can be engaged with a number of drills, thereby enabling one guide 10 to be used with a number of different drills.

Persons skilled in this art will recognize that other embodiments are within the scope and spirit of the following claims.

What is claimed is:

1. A guide for an electric drill comprising:

a transparent, elongated L-shaped member having two mutually perpendicular faces, each face having two parallel long edges and two short edges, the faces sharing a common long edge, wherein, for each face, one of the two short edges is a perpendicular edge and the other of the two short edges is an angled edge, wherein the perpendicular edges are perpendicular to the long edges, wherein the angled edges are not perpendicular to the long edges and the common long edge is formed such that the perpendicular edges are mutually adjacent to each other and the angled edges are mutually adjacent to each other;

magnetic areas formed on surfaces of each of the faces and located so as to mate with corresponding magnetic areas on a hand-held drill;

mutually perpendicular level indicators disposed on each face perpendicular to the common long edge; and a horizontal level indicator disposed on the common long edge in a direction perpendicular to the perpendicular level indicators.

2. A guide as claimed in claim 1, wherein at least one of the long edges is ruled.

3. A guide as claimed in claim 1, wherein guide lines are marked on the faces in a direction parallel to the long edges.

4. A guide as claimed in claim 1, wherein the level indicators are bubble-level indicators.

5. A guide as claimed in claim 1, wherein one angled edge forms a sixty degree angle with the common edge.

6. A guide as claimed in claim 1, wherein one angled edge forms a forty five degree angle with the common edge.

7. A guide as claimed in claim 1, wherein the short edges are formed to be non-slip edges.

8. A guide for an electric drill comprising:

a transparent, elongated L-shaped member having two mutually perpendicular faces, each face having two parallel long edges and two short edges, the faces sharing a common long edge, wherein, for each face, one of the two short edges is a perpendicular edge and the other of the two short edges is an angled edge, wherein the perpendicular edges are perpendicular to the long edges, and the common edge is formed such that the perpendicular edges are mutually adjacent to each other and the angled edges are mutually adjacent to each other;

magnetic areas formed on surfaces of each of the faces and located so as to mate with corresponding magnetic areas on a hand-held drill;

mutually perpendicular level indicators attached to each face perpendicular to the common long edge; and a horizontal level indicator attached to the common long edge in a direction perpendicular to the perpendicular level indicators, wherein at least one of the long edges is ruled, guide lines are marked on the faces in a direction parallel to the long edges, the level indicators are bubble-level indicators, and further wherein one of the angled edges forms a sixty degree angle with the common edge, the other angled edge forms a forty five degree angle with the common edge, and the short edges are formed to be non-slip edges.

* * * * *